April 17, 1956
P. W. CHARTON ET AL
2,742,590
TWO-DIMENSIONAL SCANNER OF FOCUSSED
ROTARY RADIAL BEAM TYPE
Filed Aug. 20, 1952
4 Sheets-Sheet 1
FIG. 1.
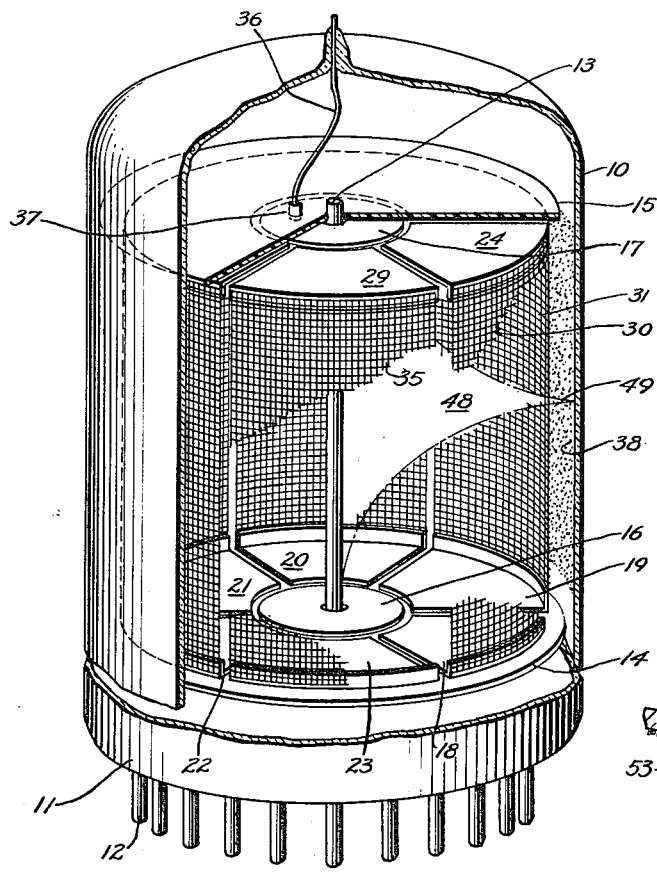
FIG. 1A.
FIG. 2.
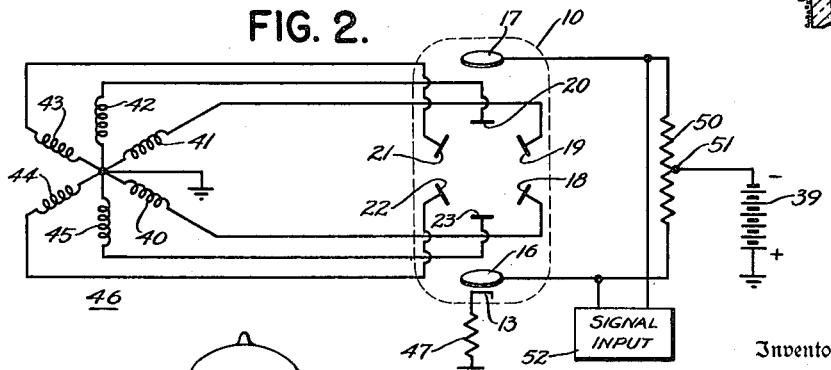
FIG. 3.
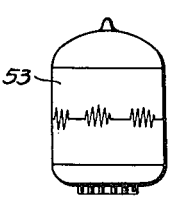
Inventors
PAUL W. CHARTON
FRED F. CRAWFORD
John J. Rogan
Attorney April 17, 1956  P. W. CHARTON ET AL  2,742,590
TWO-DIMENSIONAL SCANNER OF FOCUSSED
ROTARY RADIAL BEAM TYPE
Filed Aug. 20, 1952  4 Sheets-Sheet 2

Inventors
PAUL W. CHARTON
FRED F. CRAWFORD
By John J. Rogan
Attorney

April 17, 1956    P. W. CHARTON ET AL    2,742,590
TWO-DIMENSIONAL SCANNER OF FOCUSSED
ROTARY RADIAL BEAM TYPE Filed Aug. 20, 1952    4 Sheets-Sheet 3

Inventors
PAUL W. CHARTON
FRED F. CRAWFORD
John J. Rogan
Attorney

April 17, 1956   P. W. CHARTON ET AL   2,742,590
TWO-DIMENSIONAL SCANNER OF FOCUSSED
ROTARY RADIAL BEAM TYPE
Filed Aug. 20, 1952   4 Sheets-Sheet 4

Inventors.
PAUL W. CHARTON
FRED F. CRAWFORD
John J. Rogan
Attorney

United States Patent Office 2,742,590
Patented Apr. 17, 1956

2,742,590

TWO-DIMENSIONAL SCANNER OF THE FO-CUSSED ROTARY RADIAL BEAM TYPE

Paul W. Charton, Montclair, and Fred F. Crawford, Bloomfield, N. J., assignors to National Union Electric Corporation, Orange, N. J., a corporation of Delaware Application August 20, 1952, Serial No. 305,472

30 Claims. (Cl. 315—21)

This invention relates to electron tube apparatus and more especially it relates to systems using tubes of the focussed rotary radial beam type.

The invention is in the nature of an improvement on the kind of rotary radial beam type, such as is disclosed in U. S. Letters Patent No. 2,433,403. As disclosed in said patent and as further disclosed in "Proceedings of the Institute of Radio Engineers," volume 36, No. 11 November 1948, the focussed rotary radial beam tube employs a central linear electron-emitting cathode surrounded coaxially by a series of slotted screen electrodes in arcuately shaped array. These screen electrodes are statically biassed with respect to the cathode, and are energized by a polyphase alternating current in such a way that the electrons from the cathode are automatically focussed into a single radially extending sheet-like beam which also rotates at a uniform rate around the longitudinal axis of the cathode. I have found that by changing the construction of the said prior tube, its well-known focussing and rotating radial beam action can be used to provide a two-dimensional point-by-point scanning of a cylindrical surface.

Accordingly, it is one of the principal objects of this invention to provide a novel form of point-by-point scanner using the focussed rotary radial beam principle.

Another object is to provide an improved cathode-ray oscillograph of 360° continuous sweep.

Another object is to provide an electron tube of the focussed rotary radial beam type, wherein the beam can be subjected to a helical trajectory or trace on a cylindrical surface or target or series of targets.

Another object is to provide an electron tube of the focussed rotary radial beam type having means for causing the beam to scan a cylindrical surface at any selected level.

Another object is to provide an electron tube of the focussed rotary radial beam type, wherein a series of discrete output electrodes and respective signal-control grids are arranged in coordinate array and which can be rendered selectively effective.

Another object is to provide an improved form of electronic switching tube employing the focussed rotary radial beam principle.

Another object is to provide an improved pulse-coding tube.

Another object is to provide a novel two-dimensional pulse-counting tube.

Another object is to provide a novel modulator tube employing the focussed rotary radial beam principle.

Another object is to provide a novel form of electron tube for integrating or differentiating counting pulses and the like.

Another object is to provide a novel form of tone or frequency generator tube.

Other objects of the invention will be apparent after a consideration of the following detailed descriptions and the appended claims.

In the drawing,

Fig. 1 is a view partly sectional and in perspective of a tube according to the invention.

Fig. 1A shows a modification of the screen electrode of Fig. 1.

Fig. 2 is a schematic wiring diagram of a circuit embodying the tube of Fig. 1.

Fig. 3 is a view showing an oscillograph record produced on the tube of Fig. 1.

Figure 9:
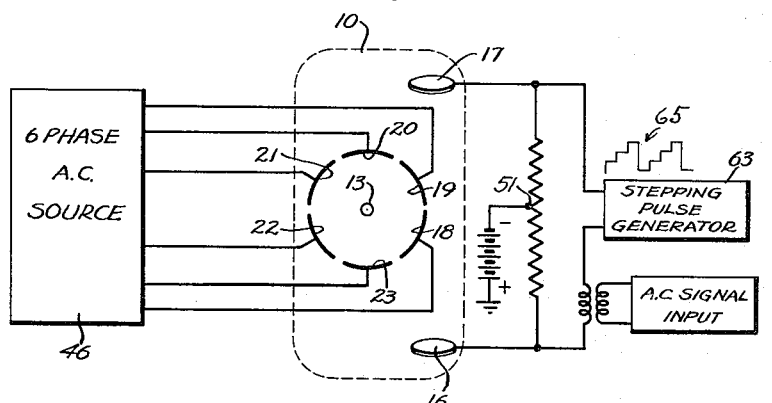

Fig. 9 schematically represents another modification of the circuit arrangement of Fig. 2, for using the tube to produce a series of parallel circular oscillographic traces.

Figure 10:
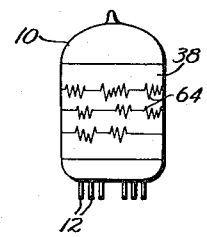

Fig. 10 shows a series of such parallel traces produced on the tube of Fig. 1 with the circuit arrangement of Fig. 9.

Figure 11:
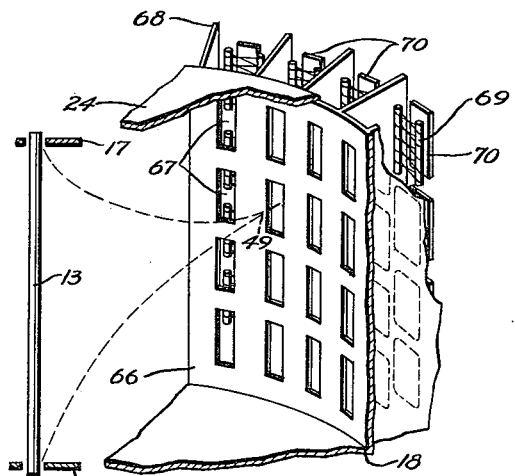

Fig. 11 shows a modification of the tube of Fig. 1.

Figs. 12, 13 14, 15, 16, 17, 18 and 19 show respective further modifications of the tube of Fig. 1.

Figure 20:
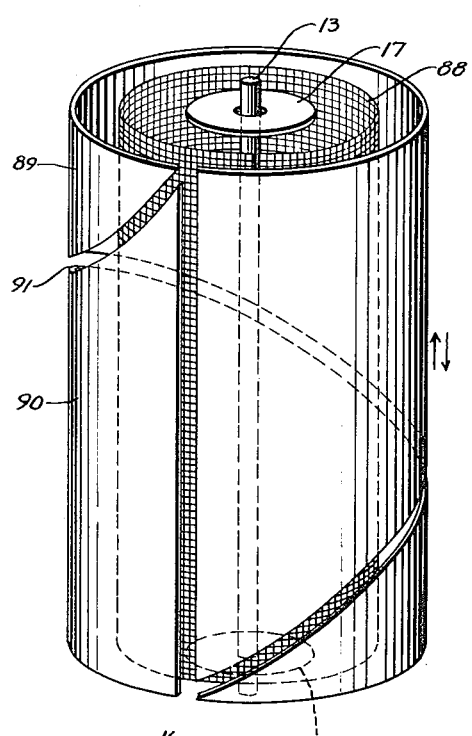

Fig. 20 shows a still further modification of the tube according to the invention.

Figure 21:
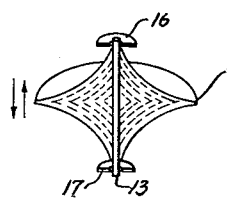

Fig. 21 is a diagrammatic view of the electron beam lamina produced by the tube of Fig. 20.

Figure 22:
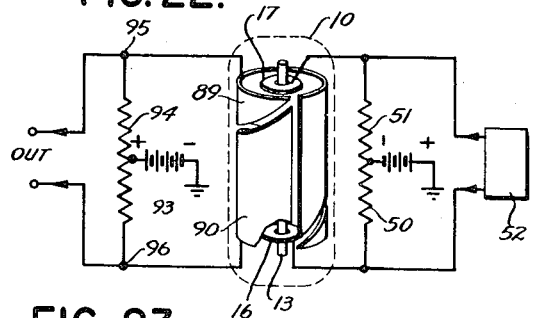

Fig. 22 is a schematic wiring diagram of a circuit embodying the tube of Fig. 20.

Figure 23:
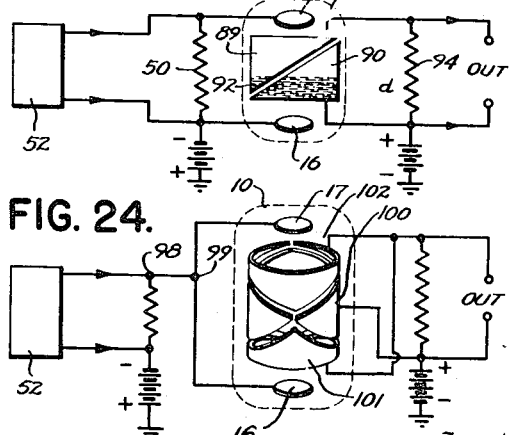

Fig. 23 is a modification of the circuit diagram of Fig. 22.

Figure 24:
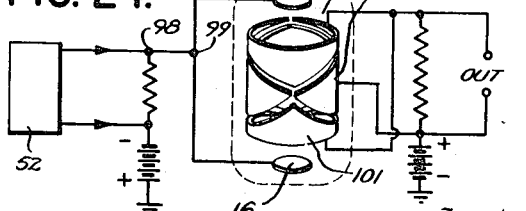

Fig. 24 is a schematic wiring diagram of a modification of the tube of Fig. 20.

Referring to Fig. 1, there is shown an evacuated glass bulb or enclosing envelope 10, such as is used in radio tubes and the like. Preferably, the bulb is of cylindrical shape and is sealed at its lower end to a suitable header 11, through which are sealed the various lead-in wires or contact prongs 12. Suitably supported centrally within bulb 10, by any means well-known in the art, is a cylindrical cathode 13 which is provided interiorly with any well-known heater wire or element (not shown), for raising the said cathode to electron-emitting temperature. Since such cathodes and their cathode coatings are well-known in the radio tube art, detailed description thereof is not necessary herein.

One convenient way of centering the cathode 13 is to provide a lower mica disc 14, and a similar upper mica disc 15, having aligned central apertures to receive respectively the lower and upper ends of the cathode sleeve. Centrally attached in any suitable way to the upper face of disc 14, is a circular metal member 16, having a central opening with a diameter larger than the diameter of the cathode sleeve, so as to insulate member 16 therefrom. Similarly there is centrally attached to the lower face of disc 15, a metal member 17, likewise having a central opening larger than the cathode sleeve.

Also attached in any suitable manner to the upper face of disc 14, are a series of six similar pie-sector shaped metal members 18–23. These sectored members have their inner margins spaced from the corresponding metal member 16. A series of six similar pie-sector shaped metal members 24–29 are attached to the lower face of mica disc 15. The members of set 24–29 are in vertical alignment with the corresponding members of set 18–23.

Suitably attached, for example by welding, to the margins of the corresponding members 18, 24; 19, 25, etc., are respective wire mesh members 30–35. A suitable lead-in wire 36 can be sealed through the top of bulb 10 and connected to a metal tab 37 attached to member 17, whereby a suitable potential can be applied to the said member 17. Likewise, another lead-in wire (not shown) can be connected at one end to the member 16 and at the other end to the corresponding one of the prongs 12 for applying a suitable potential to member 16. The interior cylindrical surface of bulb 10 is provided with a coating 38 of a phosphor or mixture of phosphors which become fluorescent when struck by an electron beam. Any phosphors well-known in the cathode-ray oscillograph tube art may be used.

In accordance with one feature of the invention, the members 16, 17 have applied thereto relatively high negative potentials from a suitable direct current biasing source 39 (Fig. 2). It will be observed that Fig. 2 shows the tube of Fig. 1 in schematic form, and the various electrodes or elements of Fig. 1 are identified in Fig. 2 by the same corresponding numerals. The pie-sector elements 18–23 are connected to respective phases 40–45 of any suitable source 46 of six-phase alternating current; and the cathode 13 is self-biased negatively with respect to members 18–23, for example by the cathode load resistor 47. As explained in said Patent No. 2,433,403, by suitable choice of the bias on cathode 13 with respect to the potentials applied to the respective sets of elements 18, 30, 24; and 19, 31, 25, etc., the electrons from the cathode 13 are focussed into a radial beam 48 which rotates at a predetermined focussed rate around the cathode as an axis.

However, we have found that, with the particular construction and arrangement of the various electrodes as shown in Fig. 1, while the electrons start out from the cathode as a sheet, this sheet can be gradually reduced in vertical length by the application of an increasingly negative bias simultaneously on the two metal members 16, 17, until it becomes focussed down to a point 49 where it impinges upon the screen 38. This focussed beam spot traces then a circular line path around the cylindrical surface of the screen 38. However, these elements 16, 17, instead of being connected directly together are connected through a suitable resistor 50, which is connected to the negative direct current biasing source 39, through a fixed center tap 51. We have found that by passing a D. C. current through the resistor 50 the bias on one metal member could be made to increase while that on the other member simultaneously decreased, thereby causing the punctural trace 49 to move paraxially toward the less negative member. Furthermore, by connecting a suitable source 52 of varying potential signals, across resistor 50, the position of the said trace can be instantaneously shifted with respect to the normal trace 53 as indicated in Fig. 3. Thus, there is provided what may be termed a 360° sweep oscillograph wherein the base or sweep line is concentric around the cathode and since the entire length of the cathode is used in producing the scanning spot, it is possible to obtain much brighter oscillograph traces. Furthermore, the oscillograph variation occurs above or below the normal line 53, and since all the parts are symmetrical about a common center or axis, the oscillographic trace for any given instantaneous voltage is uniform at all times. In the conventional oscillograph tube of the cathode-ray type, the electrons are usually produced by a relatively small area cathode which somewhat limits the amount of beam current acting on the oscillograph screen. Furthermore, in the conventional cathode-ray tube oscillograph where the beam scans a substantial flat screen, special precautions must be taken to make sure that the beam-deflecting effects are uniform at the center of the screen and at the margin thereof. Furthermore, in the conventional cathode-ray tube oscillograph, it is necessary to employ so-called fly-back circuits since the trace is limited by the width of the cathode-ray tube screen. In the system disclosed in Figs. 1 and 2, of the present application, no such fly-backs are required since the scanning is continuous and in the same direction at all times.

Instead of joining each set of pie-sector elements, for example elements 18, 24, by a foraminous or metal mesh such as 30, a similar result can be obtained by replacing each of the said meshes with an electron permeable film or coating. Thus as shown in Fig. 1A, the said meshes are replaced by electron permeable films 53, 54, 55, etc., of aluminum or the like, which can be deposited for example over the phosphor coating 38. Furthermore, this conductive material may be deposited between the glass 10 and the phosphor coating, or if desired it may be commingled with the phosphor material to render the latter a good conductor which therefore functions similarly to the meshes 30, 31, at the same time that it functions as a fluorescent screen. If desired, the phosphor itself may be a relatively high conductivity phosphor thus avoiding the use of the wire mesh or the electron transparent metal film. It will be observed, of course, that in any of these modifications, the several conductive panels on the glass wall 10 are electrically connected to the corresponding pie-sector members 18, 19, etc., and 24, 25, etc., so as to insure that the sheet-like beam 48 becomes focussed in a spot on the phosphorescent material.

Figure 4:
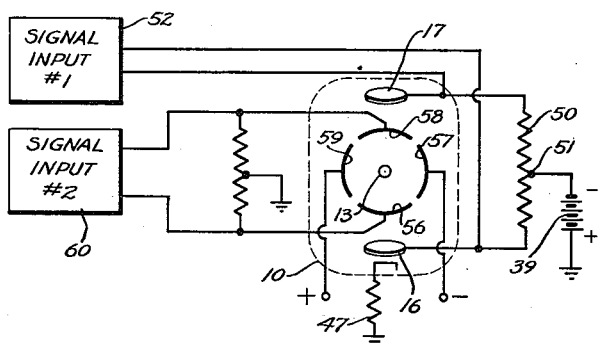
Fig. 4 shows a modification of the circuit arrangement of Fig. 2.
Figure 5:
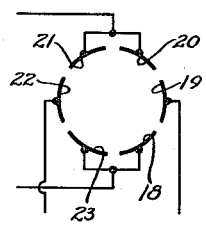
Fig. 5 is another modification of the circuit arrangement of Fig. 4.
Figure 6:
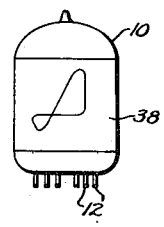
Fig. 6 shows a typical Lissajous figure produced by the circuit arrangements of Figs. 4 and 5.

As shown in Fig. 4, instead of exciting the pie-sector elements by the successive phases from a single polyphase source, two separate sources may be used for the purpose of comparing their respective frequencies and phases. Thus, one source, namely source 52, may be connected across the elements 16, 17, as in Fig. 1, but the other input source is connected to diametrically opposite pie-sector elements. In Fig. 4, the tube is shown schematically as having only four such pie-sectors 56–59, whereas Fig. 1 shows six such sectors. However, a six sector tube can be used as shown in Fig. 5, by connecting adjacent sectors 18, 23, together and by connecting the opposite pair of sectors 20, 21 together, thus providing the electrical equivalent of the four sector arrangement shown in Fig. 4. As shown in Fig. 4, the two remaining sectors 57 and 59, are connected across a direct current biassing source as indicated. Fig. 6 shows a typical trace for example in the form of a Lissajous figure whereby the frequency of the two sources 52 and 60 can be compared. Since all but an opposite pair of screens are kept at D. C. potential (suitable for focussing) and an A. C. is applied to the said pair, the spot does not rotate but oscillate about a "rest" position on the positive screen. Fig. 4 should show the minus sign (—) at the terminal of screen segment 57. Segment 59 being positive, the spot will rest there.

Figure 7:
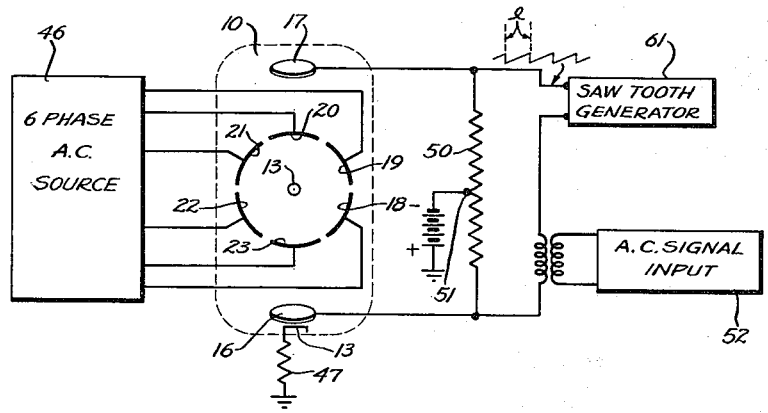
Fig. 7 is another modification of the circuit arrangement of Fig. 2, for producing a helical oscillographic trace.

Instead of producing an oscillographic trace which varies with respect to a simple circular line 53 (Fig. 3), the trace can be made continuously helical around the cylindrical screen. A circuit arrangement for accomplishing this result is shown in Fig. 7, wherein the parts which are identical with those of Figs. 1 and 2 bear the same designation numerals. The main point of difference between the embodiment of Fig. 2 and that of Fig. 7 is that in addition to impressing the alternating current input signal from source 52 on the elements 16, 17, these latter elements also have impressed thereon in series with the signals from source 52 a saw-tooth voltage wave from a suitable saw-tooth generator. The length $l$ of each saw-tooth is correlated with the frequency of the source 46 so as to be an integral multiple of the period of source 46, this multiple ratio being determined by the number of helical turns 62 which are to be produced on the screen 38.

Instead of exciting the elements 16 and 17 by a saw-tooth wave, these elements may be excited by waves from a stepping pulse generator schematically illustrated in Fig. 9 by the numeral 63. The system operates in the same way as that of Figs. 2 and 7, with the exception that the trace on the cylindrical screen 38, instead of being helical, consists of a series of parallel traces 64, the number of these parallel traces being determined, of course, by the number of steps 65 in each of the stepped pulse cycles. For example, if the frequency of the source 46 is "$k$" cycles per seconds and there are "$n$" steps in each pulse, then the pulse frequency of generator 63 has to be $k/n$ cycles per seconds. It will be understood, of course, that the invention is not limited to any particular frequency for the source 46 so long as it is correlated with the stepping pulse frequency of the source 63.

Figure 8:
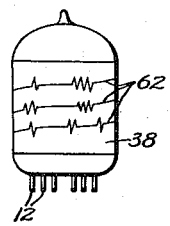
Fig. 8 shows a typical helical trace produced with the tube of Fig. 1 according to the circuit of Fig. 7.
Figure 12:
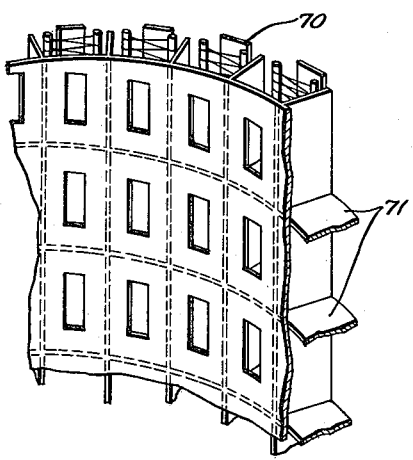

It will be understood that the invention is not limited to the two-dimensional movement of the focussed spot over a fluorescent screen such as the screen 38 (Fig. 1). For example, as shown in Fig. 11, each mesh member, for example members 30–35 of Fig. 1, can be replaced by corresponding windowed metal plates 66. Merely for simplicity, Fig. 11 shows only one pie-sector comprising the elements 18, 24 and 66, it being understood that a similar series of pie-sector elements surround the cathode 13, which in turn is provided with the end plates 16 and 17 as described in connection with Fig. 1. Referring again to Fig. 11, a series of metal flanges 68 extend radially outward from plate 66 to define a series of vertical channels one for each vertical row of windows 67. Suitably mounted in radial alignment with each window is an individual signal control grid 69 and a corresponding individual output anode 70. Each grid is provided with a separate lead-in (not shown) for connection to a corresponding signal input circuit, and each anode 70 is also connected to a corresponding individual lead-in (not shown) for connection to a corresponding suitable output circuit. The focussing action for focussing the sheet beam 48 (see Fig. 1) into a spot and the rotation of that beam and spot are effected in the same manner as described above for Figs. 1 and 2. Merely for simplicity in the drawing, the remaining parts of the tube, shown in detail in Fig. 1, are omitted in Fig. 11. Consequently as the beam spot 49 is rotated it can be shifted vertically under control of the signals applied to end plates 16 and 17 to shift the beam to any horizontal row of windows 67 to complete the circuit to any desired one of the tube anodes 70. This output can, of course, be controlled or modulated by applying a control signal to the corresponding grid 69. If desired, and as shown in Fig. 12, in addition to the vertical flanges 68, a series of horizontal flanges 71 can also be added to provide individual shielding boxes or compartments for the corresponding grid-anode sets 69–70, etc. For a sequential scanning of all the channels in a window arrangement, as shown in Figs. 11 and 12, a stepping pulse generator 63 as shown in Fig. 9 can be used. The windows can also be arranged along a helical base line, as shown in Fig. 8, which requires a saw-tooth generator 61, as shown in Fig. 7, to provide the pulses that deflect the beam gradually upwards.

Figure 13:
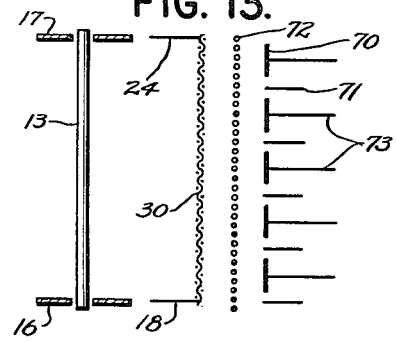

As a further modification and as shown schematically in Fig. 13, each windowed plate elements 67 may be replaced by a mesh 30 as in Fig. 1. There will then be provided behind the mesh and completely surrounding all the pie-sectors a single cylindrical foraminous or open-work grid 72 for suppressing secondary electrons that may be emitted by the anodes 70, to prevent the secondary electrons returning to the mesh electrodes 30. In the embodiment of Fig. 13, each of the output anodes 70 is connected to its individual output conductor 73 and these anodes 70 are supplied with the usual high voltage direct current anode potential from a suitable direct current power supply, whereas the grid 72 being a suppressor grid is at a lower potential. If desired, the suppressor grid 72 can be connected to the cathode 13.

Figure 14:
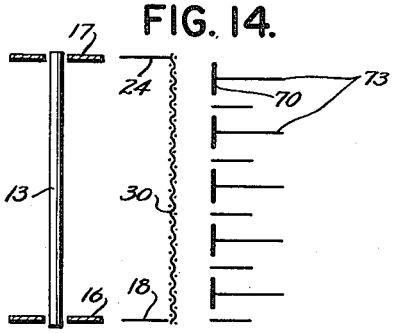

It will be understood, of course, that the electrodes 70, instead of being used as ordinary output anodes, may be used as dynodes. This is shown in Fig. 14. Each of these electrodes 70 may have its surface coated with secondary electron emission material. However, the screen meshes 30 are operated at a peak voltage higher than the electrodes 70 so that, there being no suppressor grid 72 to intercept secondary emission, the electrodes 70 assume a positive potential in response to impingement of the beam spot 49 thereon.

Figure 15:
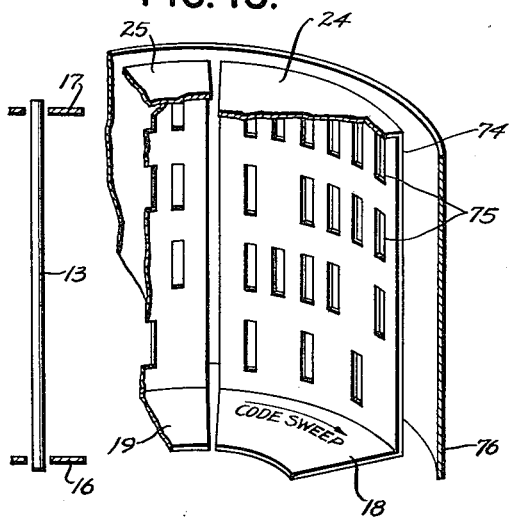

The tube of Fig. 1 may also be used to produce coded output signals. Thus, as shown in Fig. 15, each of the pie-sectors 18, 24, 30, instead of having a mesh 30, may have a metal plate 74 with horizontal rows of windows 75, there being a different number of windows in each row. The spacing of the windows in the various rows may be in accordance with any predetermined coded pattern. A single cylindrical output plate or anode 76 surrounds all the pie-sectors and corresponds functionally to the screen 38 of Fig. 1. This common anode can be connected to any suitable output circuit (not shown). The focussing of the sheet-like beam from cathode 13 to a point, and the rotation thereof are effected as hereinabove described. A control or stepped pulse wave, such as wave 65 of Fig. 9, a special control signal, or a signal to be analyzed, can be applied to the elements 16, 17, which will determine which horizontal row of windows 79 are to intercept the focussed beam. Thus, in the first instance, the tube can be used to produce the desired sequence of coded pulses as determined by the particular row of windows with which the beam cooperates as determined by the stepping pulses. It will be understood, of course, that the beam can be stepped vertically at any desired rate determined by the duration of the individual pulses in the stepping pulse wave 65. Thus, during one complete rotation of the beam the first stepping pulse may hold the beam for example in registry with the lower-most horizontal row of windows 75. On the next rotation of the beam the next stepping pulse applied to elements 16 and 17 raises the beam to the next horizontal row of windows, and so on for the remaining rows. When the last row of windows has been scanned a fly-back voltage can be produced in any well-known manner to bias the electrodes 16 and 17 to restore the beam to its normal or lower-most position. It will be understood, of course, that it is not necessary for the beam to scan all the windows in one row before being advanced or raised to any other row. For example, the length of the stepping pulses in the wave 65, can be correlated with the rotational speed of the beam so that when the beam is finished scanning the lower-most row of windows 75 in one pie-sector the next stepping pulse will advance or raise the beam to the second row of windows 75 in the next succeeding plate 74, and so on for the remaining pie-sectors.

Figure 16:
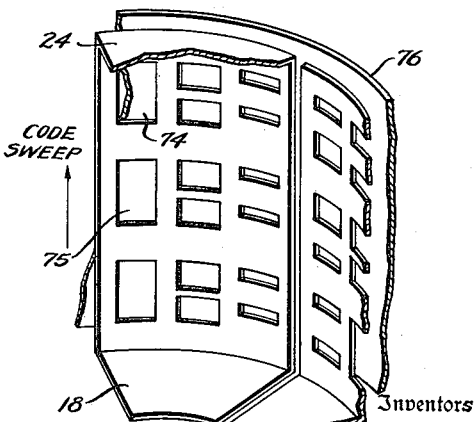

The coding action is not confined to a horizontal coded sweep. For example, as shown in Fig. 16, the plates and vertical pulses are correlated with the beam rotation to cause the beam to step vertically across any particular vertical row, and then to fly-back to, or even beyond, the lower-most window level to repeat the vertical sweep for another vertical row of windows.

Figure 17:
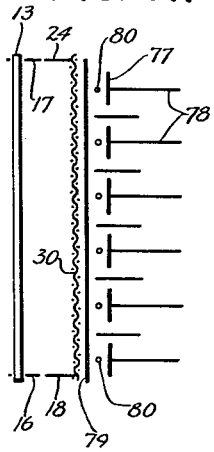
Figure 18:
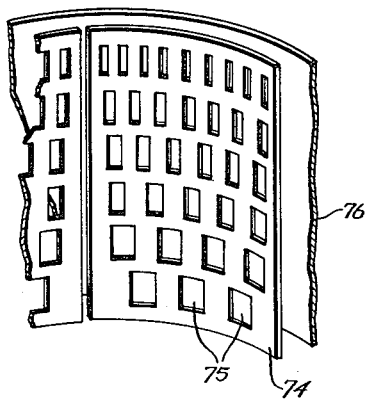

Fig. 17 shows another modification of the embodiment of Fig. 1, wherein the fluorescent screen 38 is replaced by a series of individual anodes 77, which are arranged in parallel circular rows around the cathode 13. Fig. 17 shows in schematic form only one pie-sector, for example that corresponding to the sectors 18, 30, 24 of Fig. 1. Each sector may have a single vertical row of anodes or a plurality of such rows, each anode 77 having its individual output lead 78. Located between the sets of anodes and the corresponding mesh 30 are two separate beam-holding grids 79, 80. Each of these grids, for example grid 79, may consist of a series of spaced vertical parallel wires connected to a common lead-in; and the grid 80 may consist of a series of spaced horizontal parallel wires also connected to a corresponding lead-in. The vertical wires of grid 79 are spaced apart a distance approximately equal to the horizontal width of the various anodes 77; while the horizontal wires 80 are spaced apart a distance corresponding to the height of the said anodes 77. Consequently, the two holding grids 79, 80, form a multiplicity of aligned grid wire crossings each of which is allotted to a corresponding one of the anodes 77. It is well-known in the art that by suitable integrating circuits it is possible to develop a voltage which is proportional in magnitude to the number of pulses injected into the integrating circuit, up to a certain fly-back point where the voltage returns to its original value. The sources 52 and 60 herein above referred to (Fig. 4) may be such sources of pulse-integrated voltage which can be connected to the elements 16, 17 (Figs. 4 and 17) and segments 56 and 58 (Fig. 4). Therefore, the beam spot 49 will be deflected on to the appropriate anode which is allotted to the particular number of pulses that have been integrated. The holding grids 79, 80, can be automatically controlled in potential, for example as explained in application Serial No. 146,029, filed February 24, 1950, to hold the spot in its deflected position until the receipt of another integrated series of pulses. Thus, the tube of Fig. 17 can be used in two directions as a pulse counter.

The tube can also be used as a tone generator. For example, the embodiment of Fig. 15, instead of having the windows 74 in each row unevenly spaced or according to a code, may be equally spaced as indicated schematically in Fig. 18. Thus, the position of the beam vertically will determine the frequency of the output signal which is taken off from the anode 76.

Figure 19:
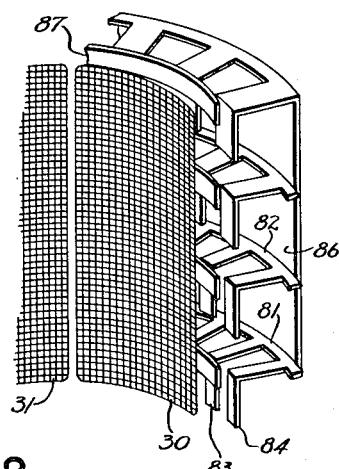

A modification of this form of tone generator is shown in Fig. 19. Instead of using windowed plate-like sectors 74, these sectors may be replaced by the wire mesh elements 30, 31, similar to those of Fig. 2. The anode, instead of being a single cylindrical late may be formed of a series of metal strips 81, 82, etc., each having a series of downwardly extending integral tongues 83, 84, etc. These strips, if desired, may be attached to a common metal frame or plate 86. In the latter case, a separate windowed shield 87 surrounds the meshes 30, 31. This shield has a series of rows of windows each in radial alignment with the respective tongues 83, 84, so that the unwindowed portions cut off the beam from the anode while the beam is passing from one tongue to the next adjacent tongue.

Fig. 20 shows a still further modification wherein the cathode 13 with its end discs 16–17, is surrounded by a single wire mesh 88 which is held at a predetermined constant direct current potential, for example 400 volts positive with relation to the cathode 13. This mesh is surrounded by two cylindrically curved metal wedge-shaped anodes 89, 90, which have their adjacent edges spaced to form a narrow helical gap 91. When the input signal is impressed across elements 16 and 17 as described above in connection with Fig. 2, and when the mesh 88 is appropriately biassed, the electron beam from the cathode 13 completely surrounds the cathode but is focussed down to a horizontal sheet or circular lamina 92 as indicated diagrammatically in Fig. 21. However, the varying potentials applied to the elements 16 and 17, causes this lamina 92 to be shifted vertically in the direction of the arrows, thus causing a variable amount of intercept with the two helical anodes 89, 90. The schematic circuit arrangement for this embodiment is shown in Fig. 22 and the output is taken off from the anodes 89, 90. The said anodes are supplied with their positive D. C. potential preferably in balanced relation by means of the direct current plate supply source 93 which is connected to the midpoint of the load resistor 94. It will be seen therefore, that if the potential of one of the elements 16 is increased while that of the other element 17 is decreased, the electron beam can be made to remain as a fine circular line whose location along the length of the anodes 89, 90, depends upon the relative potential difference between the said elements 16, 17. Therefore, the difference between the currents to anodes 89, 90, varies with the vertical distance of the beam lamina 92 with respect to the circular edges of the said anodes. In other words, the potential between the points 95, 96, is proportional to the distance of the beam lamina 92, taken algebraically, from its central position as indicated by the arrow 97 (Fig. 20). The current from each individual anode 89, 90, is also proportional to the lamina displacement, but in opposite directions. If one of the elements, for example element 16 is kept at a constant potential and the other element 17 is connected to a variable signal source, and if only one of the anode outputs is used, then the device acts as an integrator; the width $d$ (Fig. 23) of the circular beam lamina 92 increases and decreases with the signal.

In a further modification as shown in Fig. 24, the two elements 16, 17, are connected in parallel to the same input terminal 98 of the signal input circuit so that both elements 16, 17, vary simultaneously in potential in the same sense. With this arrangement, the beam lamina 92 remains centrally located, or at any other arbitrary normal position with respect to the length of the cathode but its width either increases or decreases in accordance with the input signal. With this arrangement however, three separate anode sectors are required. The sector 99 may be diamond-shaped and curbed to cylindrical contour with their horizontal apices in horizontal alignment. On the other hand, the sectors 101, 102, may be triangular and curved to cylindrical sector shape.

It will be understood, of course, that while the continuous rotation of the focussed beam in the embodiments of Figs. 1 to 19 is effected electrostatically by connecting a multi-phase alternating current source to the various pie-sectors, the beam rotation may be effected by suitable electromagnetic means as disclosed in the above-mentioned I. R. E. publication.

What is claimed is:

1. Electron tube apparatus of the focussed rotary radial beam type, comprising in combination, a central electron-emitting cathode, a series of sector electrodes surrounding the cathode adjacent one end, a similar and corresponding series of sector electrodes surrounding the cathode at the opposite end, respective sectors at opposite ends of the cathode being joined by respective foraminous grids, each corresponding pair of sector electrodes being arranged for connection to a respective phase of a polyphase source of current to form the electrons from the cathode into a radial beam which terminates in a spot rotating around the cathode along a predetermined circular trace, and other electrodes surrounding the cathode at opposite ends thereof and arranged to have their relative potentials varied by signal voltages to change correspondingly the position of said spot with respect to said trace as the spot is rotating.

2. Electron tube apparatus of the focussed rotary radial beam type, comprising in combination, a central substantially linear elongated electron emitter, a pair of insulated spacer discs one at each end of the cathode for supporting it centrally, a plurality of separate metal sectors attached to one insulator disc, a similar corresponding plurality of separate metal sectors attached to the other insulator disc, corresponding sectors on both discs being connected together by respective foraminous grids and to a respective phase of a polyphase current source to form the electrons into a rotating triangular-shaped beam with the base of the triangle extending along the emitter and with the apex of the triangle rotating at a predetermined level with respect to the length of the emitter and around the emitter, and other electrodes for shifting the said level of the said beam apex in accordance with signal voltages.

3. Electron tube apparatus according to claim 2 in which a cylindrical fluorescent screen surrounds said cathode and upon which the said apex of the beam terminates.

4. Electron tube apparatus of the focussed rotary radial beam type, comprising in combination, a central substantially linear cathode, a plurality of pie-sector electrodes surrounding the cathode and arranged for connection each to a respective phase of a polyphase current to focus the beam to sheet-like form while causing it to rotate around the cathode, each of said pie-sectors having an element extending radially towards the cathode and a foraminous element extending parallel to the cathode to form the sheet-like beam from the cathode into a spot while it is rotating around the cathode, and other electrodes surrounding the cathode adjacent opposite ends to change the position of said spot with respect to the length of said cathode while the spot is rotating around the cathode.

5. Electron tube apparatus of the focussed rotary radial beam type, comprising in combination, a central substantially linear elongated cathode, a plurality of separate cylindrical-sector and electron permeable electrodes surrounding the cathode arranged for connection each to a respective phase of a polyphase current source to rotate the radial beam, a cylindrical fluorescent screen element surrounding said electron permeable electrodes, a plurality of conductive elements one for each of said electrodes and disposed adjacent opposite ends of the cathode to form the sheet-like radial beam into a spot and other electrode means adjacent the ends of the cathode for changing the position of the spot on said screen parallel to the length of the cathode while said spot is rotating around the cathode.

6. Electron tube apparatus according to claim 5 in which each of said electron permeable electrodes is in the form of a foraminous member connected to a corresponding one of said conductive elements.

7. Electron tube apparatus according to claim 5 in which each of said electron permeable electrodes is in the form of a multi-windowed metal plate.

8. Electron tube apparatus according to claim 5 in which each of said electron permeable electrodes is in the form of an electron transparent metal film.

9. Electron tube apparatus according to claim 5 in which all said electrodes are mounted within a glass bulb and said fluorescent screen is applied to the inner surface of said bulb and surrounding all said electrodes.

10. Electron tube apparatus of the focused rotary radial beam type, comprising in combination, a central substantially linear elongated electron-emitting cathode, a series of separate cylindrical sector electrode elements surrounding the cathode and arranged for connection each to a respective phase of a polyphase current source to form the electrons into a single radial rotary sheet-like beam, other electrodes disposed at the ends of the cathode to form the sheet-like beam into a spot, a cylindrical fluorescent screen upon which said spot impinges, and means to apply varying signal potentials to said other electrodes while said spot is rotating to form an oscillographic trace extending around said screen and having a circular base line.

11. Electron tube apparatus according to claim 10, in which each of said cylindrical sector electrode elements is in the form of a multi-windowed member.

12. Electron tube apparatus according to claim 10, in which each of said cylindrical sector electrode elements is in the form of an electron transparent film.

13. Electron tube apparatus according to claim 10, in which each of said cylindrical sector electrode elements is constituted of a conductive phosphor.

14. Oscillographic apparatus comprising in combination, an evacuated glass bulb having its inner wall provided with a coating of fluorescent material, a substantially linear elongated electron emitter centrally located within said bulb, means to form the electrons from said emitter into a substantially triangular sheet-like radial beam whose base extends along said emitter and whose apex terminates at said screen, the last-mentioned means including a first series of sectored conductor elements surrounding the emitter adjacent one end thereof, and a second similar series of sectored conductor elements surrounding the emitter adjacent the opposite end thereof with the corresponding sectored elements at the opposite ends of the emitter being connected together by respective foraminous electrodes and arranged for connection each to a respective phase of a polyphase current source, and electrode means adjacent the ends of the emitter to shift the said apex of the beam transversely to its direction of rotation around said screen to form an oscillographic trace with a circular base line.

15. Oscillographic apparatus according to claim 14 in which a source of saw-tooth voltage is connected to said electrodes to cause said spot to execute a helical oscillographic trace completely around said screen.

16. Oscillographic apparatus according to claim 14 in which a source of stepped pulses is connected to said electrodes to cause said spot to execute a series of parallel circular oscillographic traces around said screen.

17. Electron tube apparatus comprising a tube of the focussed rotary radial beam type, comprising a central electron emitting cathode normally arranged to emit electrons simultaneously in radial directions, a series of separate electron permeable electrodes surrounding the cathode each arranged to be energized by a respective phase of a polyphase current to form said electrons into a single sheet-like beam rotating around the cathode, each of said permeable electrodes having a series of windows arranged in tiers around the cathode, output anode means surrounding said permeable electrodes, and other electrodes surrounding the cathode at opposite ends thereof to form said sheet-like beam to a spot and responsive to varying potentials to shift said spot into registry with any desired window in any desired tier of windows in said permeable electrodes.

18. Electron tube apparatus according to claim 17 in which said anode means comprises a series of separate output anode elements arranged in tiers each such element being in registry with one of said windows.

19. Electron tube apparatus according to claim 18 in which an individual control grid is mounted between each of said anode elements and the corresponding one of said windows.

20. Electron tube apparatus according to claim 17 in which said anode means comprises a series of individual output anodes, and a common electron suppressor grid surround said windowed electrodes and is located between said windowed electrodes and said anode elements.

21. Electron tube apparatus according to claim 17 in which said anode means comprises a series of dynode elements arranged in tiers.

22. Electron tube apparatus according to claim 17 in which the windows in said windowed electrodes are arranged in horizontal coded groups, and means are provided for shifting the position of said spot from one horizontal group to another in succession as said spot is rotated.

23. Electron tube apparatus according to claim 17 in which said windows in said windowed electrodes are arranged in vertical coded groups, and means are provided for vertically shifting said spot along one vertical group before said spot is rotated to another vertical group.

24. Electron tube apparatus according to claim 17 in which the windows in each tier are equally spaced from each other but with the number of windows in one tier different from the number of windows in the other tiers.

25. Electron tube apparatus comprising a substantially linear electron emitting cathode, a series of electrodes surrounding said cathode for focussing electrons from the cathode into a single substantially triangular shaped sheet-like beam with the base of the triangle extending along the cathode, a plurality of anode elements arranged in tiers and upon which the apex of said beam is to be selectively positioned, a pair of electrodes mounted adjacent the ends of the cathode and arranged to be energized by variable potentials to shift the beam apex to any particular anode element upon which it is to impinge, and beam holding electrode means located in front of the anode elements to hold the apex of the beam in registry with the particular anode element to which it has been shifted.

26. Electron tube apparatus comprising a substantially linear electron emitting cathode, a pair of wedge-shaped anode elements formed to cylindrical contour around the cathode and defining between their adjacent edges a helical gap surrounding the cathode, said cathode normally emitting electrons in a cylindrical beam whose intercept with said anode elements has a length commensurate with the length of the emitting cathode, a pair of electrodes surrounding the cathode at opposite ends to distort the beam so that the said intercept is restricted and is only a small portion of the length of the cathode, and means to apply varying signal potentials to said pair of electrodes to vary the location of said restricted intercept with said anode elements whereby one anode element intercepts a different quantity of electrons as compared with the other anode element and an output circuit connected at opposite ends to said anode elements.

27. Electron tube apparatus according to claim 26 in which said pair of electrodes are connected in opposite phase to a signal input circuit.

28. Electron tube apparatus according to claim 26 in which said pair of electrodes are normally equally biassed to maintain said restricted intercept symmetrical with respect to the anode elements and located approximately centrally with respect to the length of the cathode.

29. Electron tube apparatus according to claim 26 in which said pair of electrodes are unequally biassed to maintain normally said restricted intercept in line with the lower end of the cathode and said signal potentials are applied to said pair of electrodes to vary the potential of one of said pair of electrodes with respect to the other to increase the dimension of said intercept considered along the length of the cathode.

30. Electron tube apparatus comprising a substantially linear electron emitting cathode, a set of two similar wedge-shaped anode elements and one diamond-shaped element formed to cylindrical contour around the cathode and defining between their adjacent edges a pair of intersecting helical gaps surrounding the cathode, said cathode emitting electrons whose intercept with said anode elements is commensurate with the length of the cathode, a pair of electrodes mounted adjacent the cathode ends and biassed with respect to each other to cause said intercept to have a restricted width which is normally symmetrical with all said anode elements, and means to apply variable signal potentials to said pair of electrodes to cause the width of said restricted intercept to vary vertically, and an output circuit having one terminal connected to one pair of anode elements and the other terminal connected to the remaining pair of anode elements.

References Cited in the file of this patent

UNITED STATES PATENTS

| | | |
|---|---|---|
| 2,164,922 | Hollmann | July 4, 1939 |
| 2,172,316 | Bowie | Sept. 5, 1939 |
| 2,193,959 | Bull et al. | Mar. 19, 1940 |
| 2,197,042 | Gray | Apr. 16, 1940 |
| 2,387,045 | Skellett | Oct. 16, 1945 |
| 2,390,884 | Jansky | Dec. 11, 1945 |
| 2,391,967 | Hecht et al. | Jan. 1, 1946 |
| 2,399,429 | Edwards | Apr. 30, 1946 |
| 2,433,403 | Skellett | Dec. 30, 1947 |
| 2,460,966 | Adler | Feb. 8, 1949 |
| 2,533,401 | Schramm | Dec. 12, 1950 |
| 2,624,021 | Gardner | Dec. 30, 1952 |